United States Patent
Huang et al.

(10) Patent No.: US 7,352,566 B2
(45) Date of Patent: Apr. 1, 2008

(54) COMMON LOCK FOR DUAL-USAGE PORTABLE COMPUTER

(75) Inventors: Chao-Ming Huang, Taipei (TW); Wen-Chieh Wang, Taipei (TW); Chi-Hsuan Hung, Jhongshan District (TW)

(73) Assignee: Tatung Co., Ltd. (TW)

( * ) Notice: Subject to any disclaimer, the term of this patent is extended or adjusted under 35 U.S.C. 154(b) by 461 days.

(21) Appl. No.: 11/178,390

(22) Filed: Jul. 12, 2005

(65) Prior Publication Data
US 2006/0146489 A1 Jul. 6, 2006

(30) Foreign Application Priority Data
Dec. 30, 2004 (TW) ................ 93141394 A

(51) Int. Cl.
*H05K 5/00* (2006.01)
*H05K 7/00* (2006.01)
*H05K 7/16* (2006.01)

(52) U.S. Cl. ............... 361/683; 361/680; 361/681; 361/726; 361/732; 70/67; 70/69

(58) Field of Classification Search ............ 70/67, 70/69–74; 312/223.1, 223.2, 223.3; 361/680, 361/681, 683, 732
See application file for complete search history.

(56) References Cited

U.S. PATENT DOCUMENTS

| | | | |
|---|---|---|---|
| 6,517,129 B1* | 2/2003 | Chien et al. ............. | 292/251.5 |
| 6,937,465 B2* | 8/2005 | Park ........................... | 361/683 |
| 7,173,816 B2* | 2/2007 | Song ......................... | 361/683 |
| 2005/0206169 A1* | 9/2005 | Lin et al. ................... | 292/24 |
| 2006/0007649 A1* | 1/2006 | Yang ......................... | 361/683 |
| 2006/0138784 A1* | 6/2006 | Wang et al. .............. | 292/24 |
| 2007/0030635 A1* | 2/2007 | Song ......................... | 361/683 |
| 2007/0075550 A1* | 4/2007 | Shi et al. .................... | 292/8 |
| 2007/0120372 A1* | 5/2007 | Zhang et al. ............. | 292/8 |
| 2007/0120373 A1* | 5/2007 | Zhang et al. ............. | 292/42 |

* cited by examiner

*Primary Examiner*—Lisa Lea-Edmonds
*Assistant Examiner*—Anthony M Haughton
(74) *Attorney, Agent, or Firm*—Lowe Hauptman Ham & Berner, LLP

(57) ABSTRACT

A common lock used in a dual-usage portable computer formed of a base member and a display is disclosed to include an elongated operating frame bar longitudinally slidably mounted inside the display of the portable computer, a left-side frame and a right-side frame respectively fixedly mounted inside the display, a left-side hook coupled between the left end of the elongated operating frame bar and the left-side frame for locking the display to the base member when the computer is set in the form of a notebook computer, and a right-side hook coupled between the right end of the of the elongated operating frame bar and the left-side frame for locking the display to the base member when the computer is set in the form of a tablet PC.

6 Claims, 5 Drawing Sheets

COMMON LOCK FOR DUAL-USAGE PORTABLE COMPUTER

RELATED APPLICATION

The present application is based on, and claims priority from, Taiwanese Application Number 093141394, filed Dec. 30, 2004, the disclosure of which is hereby incorporated by reference herein in its entirety.

BACKGROUND OF THE INVENTION

1. Field of the Invention

The present invention relates to a lock and more particularly, to a common lock for use in a dual-usage portable computer.

2. Description of Related Art

A conventional dual-usage portable computer generally comprises a base member and a display. The base member has a keyboard assembly set at the top side thereof. The display is pivotally connected to the base member and rotated relative to the base member between a first position where the screen of the display faces to the base member and the portable computer is used as a notebook computer, and a second position where the screen of the display is set at the opposite side relative to the base member and the portable computer is used as a tablet PC.

FIG. 1 shows a conventional dual-usage portable computer. As illustrated, the dual-usage portable computer 9 comprises a base member 91, and a display 92. The display 92 is pivotally connected to the base member 91 and rotated relative to the base member 91 for enabling the portable computer 9 to be used as a notebook computer or tablet PC. This dual-usage portable computer 9 further comprises lock means for locking the display 92 to the base member 91 when closed. This lock means comprises a hook 93 perpendicularly extending from the front side of the display 92 on the middle right above the screen 921, and a lock hole 94 disposed at the top side of the base member 91 corresponding to the hook 93. When closing the display 92 on the base member 91, the hook 93 is forced into the lock hole 94 to lock the display 92 to the base member 91. This lock means is functional. However, when the portable computer 9 is set for use as a tablet PC, the hook 93 is exposed to the outside. At this time, the lock means cannot be used to lock the display 92 to the base member 91, and the display 92 may be moved accidentally relative to the base member 91.

SUMMARY OF THE INVENTION

The present invention has been accomplished under the circumstances in view. It is therefore the main object of the present invention to provide a common lock, which is practical for use in a dual-usage portable computer for locking the portable computer in the form of a notebook computer or a tablet PC. According to the present invention, the common lock is used in a dual-usage portable computer comprised of a base member and a display pivotally connected to the base member and rotated relative to the base member. The display has a front wall, a back wall, and a peripheral wall connected between the front wall and the back wall. The front wall has an elongated slot. The back wall has an elongated slot. The peripheral wall has an elongated opening disposed between the elongated slot of the front wall and the elongated slot of the back wall. The base member has a locating hole at a top wall thereof.

The common lock comprises an elongated operating frame bar, a left-side frame, a right-side frame, a left-side hook, and a right-side hook.

The elongated operating frame bar is longitudinally slidably mounted inside the display, comprising an operating portion projecting from a middle part thereof and extending through the elongated opening of the peripheral wall to the outside of the display, at least one first vertical slot cut through a left-side endpiece thereof, and at least one second vertical slot cut through a right-side endpiece thereof. The left-side frame is fixedly mounted inside the display and adjacent to the left-side endpiece of the elongated operating frame bar, having at least one oblique slot sloping leftwards corresponding to the at least one first vertical slot of the elongated operating frame bar. The right-side frame is fixedly mounted inside the display and adjacent to the right-side endpiece of the elongated operating frame bar, having at least one oblique slot sloping rightwards corresponding to the at least one second vertical slot of the elongated operating frame bar. The left-side hook is sandwiched in between the left-side endpiece of the elongated operating frame bar and the left-side frame, having at least one protruding portion symmetrically disposed at each of two opposite sides thereof and respectively inserted into the at least one first vertical slot of the elongated operating frame bar and the at least one oblique slot of the left-side frame and a retaining portion curved downwards from one end thereof for insertion through the elongated slot of the front wall of the display into the locating hole of the base member. The right-side hook is sandwiched in between the right-side endpiece of the elongated operating frame bar and the right-side frame, having at least one protruding portion symmetrically disposed at each of two opposite sides thereof and respectively inserted into the at least one second vertical slot of the elongated operating frame bar and the at least one oblique slot of the right-side frame and a retaining portion curved upwards from one end thereof for insertion through the elongated slot of the back wall of the display into the locating hole of the base member.

By means of moving the elongated operating frame bar leftwards or rightwards to force the left-side hook or right-side hook out of the display into engagement with the base member, the dual-usage portable computer is locked in the form of a notebook computer or tablet PC. Therefore, the operation of the present invention is simple.

The at least one first vertical slot of the elongated operating frame bar further comprises a first horizontal slot extending at left angles at a top side thereof, the at least one second vertical slot of the elongated operating frame bar further comprises a second horizontal slot extending at right angles at a bottom side thereof.

The number of the at least one first vertical slot can be two; the number of the at least one oblique slot of the left-side frame can be two; the number of the at least one protruding portion at each of the two opposite sides of said left-side frame can be two.

Similarly, the number of the at least one second vertical slot can be two; the number of the at least one oblique slot of the right-side frame can be two; the number of the at least one protruding portion at each of the two opposite sides of the right-side frame can be two.

The elongated operating frame bar further comprises a left-side locating groove spaced between the left-side endpiece and the middle part. The common lock further comprises a left-side locating plate fixedly mounted inside the display. The left-side locating plate has a left locating flange adapted to engage into the left-side locating groove of the elongated operating frame bar.

The elongated operating frame bar further comprises a right-side locating groove spaced between the right-side endpiece and the middle part. The common lock further comprises a right-side locating plate fixedly mounted inside the display. The right-side locating plate has a right locating flange adapted to engage into the right-side locating groove of the elongated operating frame bar.

DETAILED DESCRIPTION OF THE PREFERRED EMBODIMENT

Figure 1:
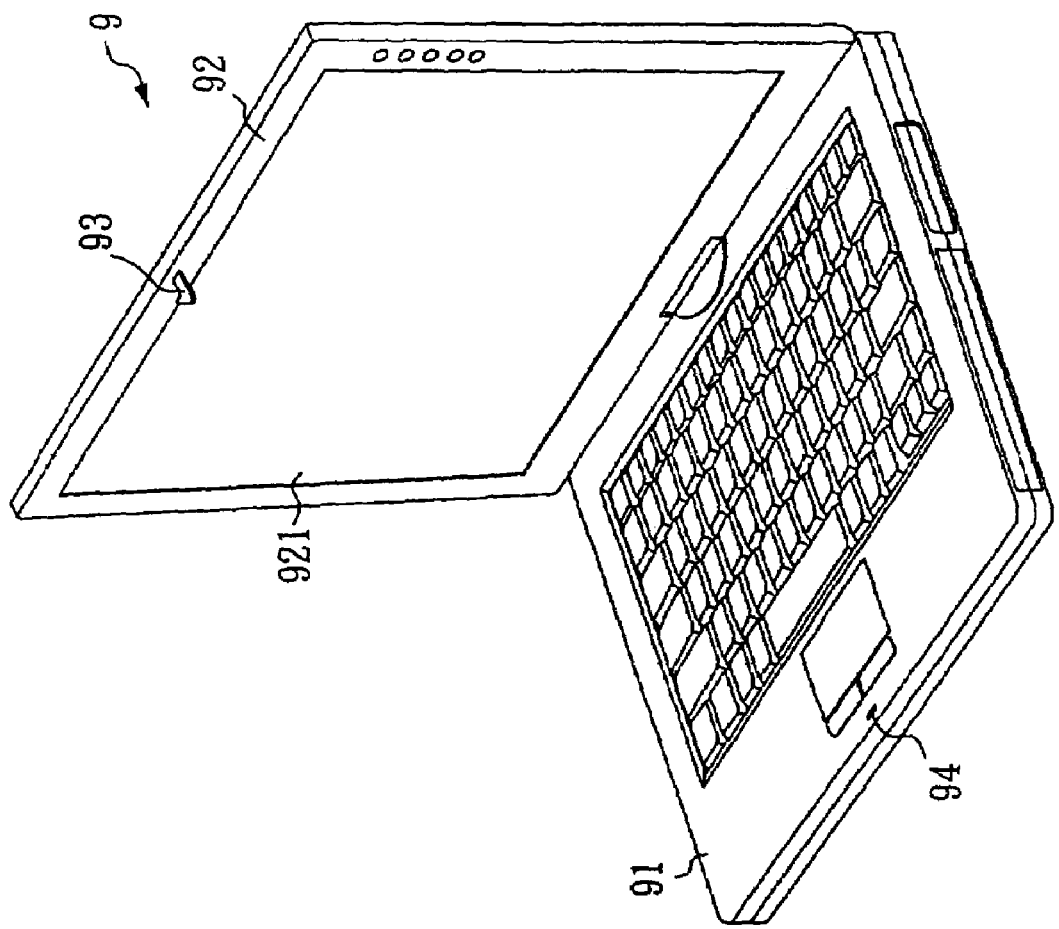
FIG. 1 is an elevational view of a dual-usage portable computer according to the prior art.
Figure 2:
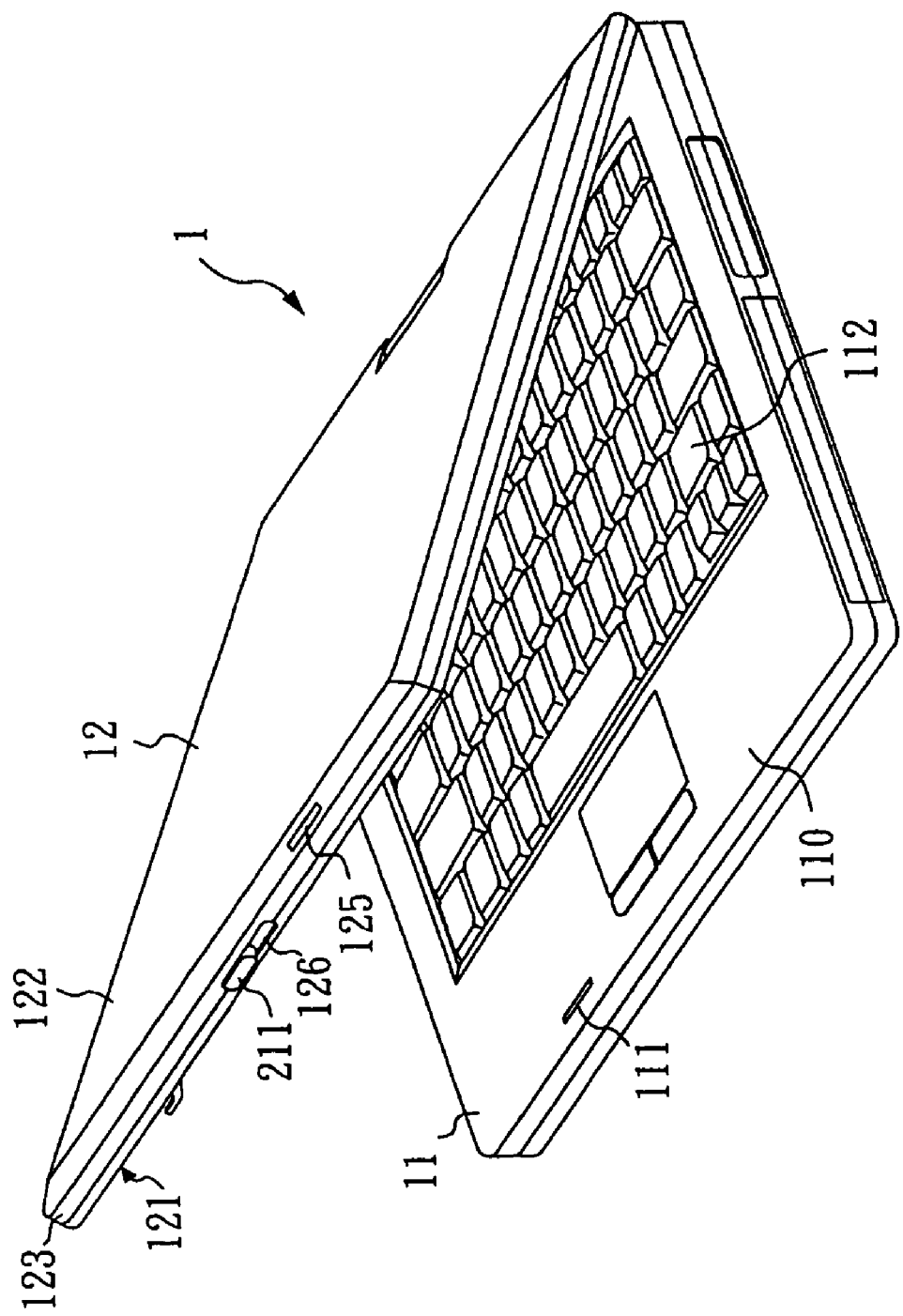
FIG. 2 illustrates a dual-usage portable computer embodying the present invention.

Referring to FIG. 2, a dual-usage portable computer 1 in accordance with the present invention is shown comprised of a base member 11 and a display 12. The display 12 is pivotally connected to the base member 11 and rotated relative to the base member 11.

Figure 3:
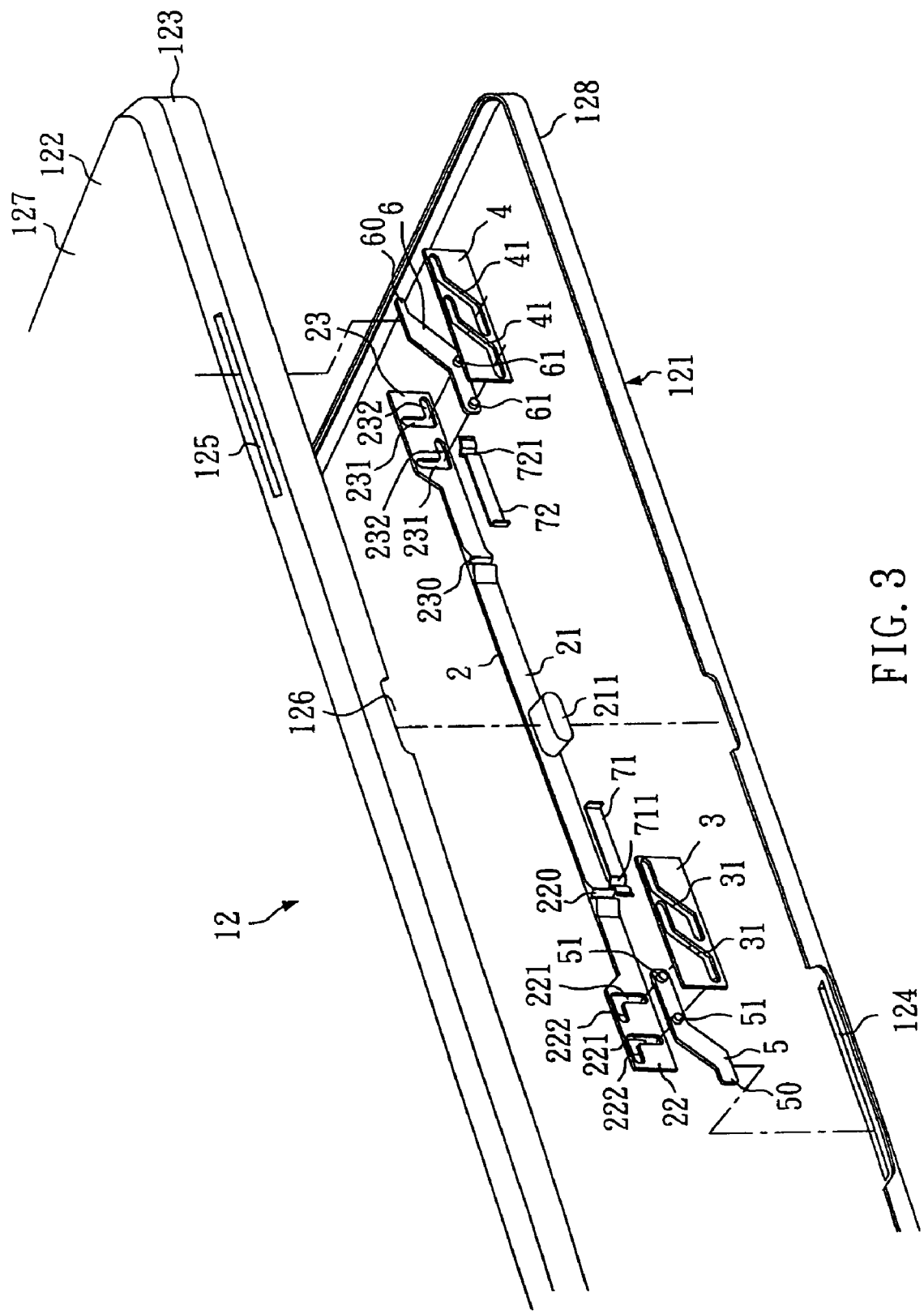
FIG. 3 is an exploded view of the preferred embodiment of the present invention.

Referring to FIG. 3 and FIG. 2 again, the display 12 is formed of two cover shells, namely, the top cover shell 127 and the bottom cover shell 128, having a front wall 121, a back wall 122, and a peripheral wall 123 connected between the front wall 121 and the back wall 122 around the border. The front wall 121 has an elongated slot 124. The back wall 122 has an elongated slot 125. The peripheral wall 123 has an elongated opening 126 disposed between the elongated slot 124 of the front wall 121 and the elongated slot 125 of the back wall 122.

The base member 11 of the dual-usage portable computer 1 has a top wall 110 and a keyboard 112 mounted in the top wall 110. The top wall 110 has a locating hole 111. Therefore, when rotating or turning the display 12 relative to the base member 11, the dual-usage portable computer 1 can be set into the mode for use as a notebook computer or tablet PC.

Referring to FIG. 2 and FIG. 3 again, a common lock is installed in the display 12 between the top cover shell 127 and the bottom cover shell 128. The common lock comprises an elongated operating frame bar 2, a left-side frame 3, a right-side frame 4, a left-side hook 5, a right-side hook 6, a left-side locating plate 71, and a right-side locating plate 72.

The elongated operating frame bar 2 is longitudinally slidably mounted inside the display 12, comprising a middle part 21, a left-side endpiece 22 and a right-side endpiece 23 respectively extending from the two distal ends of the middle part 21, an operating portion 211 projecting from the middle part 21 corresponding to the elongated opening 126 of the peripheral wall 123, two first vertical slots 221 cut through the left-side endpiece 22, two second vertical slots 231 cut through the right-side endpiece 23, a first locating groove 220 spaced between the left-side endpiece 22 and the middle part 21, and a second locating groove 230 spaced between the right-side endpiece 23 and the middle part 21.

The left-side frame 3 is fixedly mounted inside the display 12 and adjacent to the left-side endpiece 22 of the elongated operating frame bar 2, having two oblique slots 31 sloping leftwards corresponding to the two first vertical slots 221 of the elongated operating frame bar 2.

The right-side frame 4 is fixedly mounted inside the display 12 and adjacent to the right-side endpiece 23 of the elongated operating frame bar 2, having two oblique slots 41 sloping rightwards corresponding to the two second vertical slots 231 of the elongated operating frame bar 2.

The left-side hook 5 is sandwiched in between the left-side endpiece 22 of the elongated operating frame bar 2 and the left-side frame 3, having two pairs of protruding portions 51 symmetrically protruded from two opposite sides thereof and respectively inserted into the first vertical slots 221 of the elongated operating frame bar 2 and the oblique slots 31 of the left-side frame 3 and one end curved downwards and terminating in a retaining portion 50.

The right-side hook 6 is sandwiched in between the right-side endpiece 23 of the elongated operating frame bar 2 and the right-side frame 4, having two pairs of protruding portions 61 symmetrically protruded from two opposite sides thereof and respectively inserted into the second vertical slots 231 of the elongated operating frame bar 2 and the oblique slots 41 of the right-side frame 4 and one end curved upwards and terminating in a retaining portion 60.

The left-side locating plate 71 is fixedly mounted inside the display 12, having a left locating flange 711 corresponding to the first locating groove 220 of the elongated operating frame bar 2.

The right-side locating plate 72 is fixedly mounted inside the display 12, having a right locating flange 721 corresponding to the second locating groove 230 of the elongated operating frame bar 2.

Figure 4:
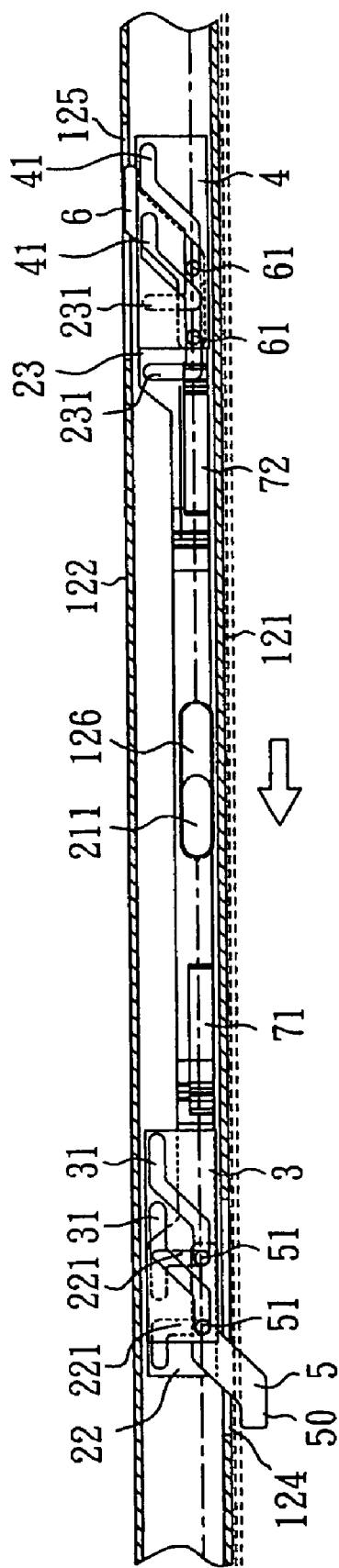
FIG. 4 is a sectional view of the preferred embodiment of the present invention (I).

Referring to FIG. 4 and FIG. 2 and FIG. 3 again, when wishing to receive the dual-usage portable computer 1 in the form of a notebook computer, i.e., to close the display 12 on the base member 11, grasp the operating portion 211 of the elongated operating frame bar 2 with the fingers to move the elongated operating frame bar 2 leftwards relative to the display 12. At this time, the left-side hook 5 is forced by the first vertical slots 221 of the elongated operating frame bar 2 and the oblique slots 31 of the left-side frame 3 to insert the retaining portion 550 through the elongated slot 124 of the front wall 121 of the display 12 into the locating hole 111 of the base member 11.

In the aforesaid operating procedure, the first vertical slots 221 of the elongated operating frame bar 2 and the oblique slots 31 of the left-side frame 3 force the left-side hook 5 to move smoothly. The elongated operating frame bar 2 further has two first horizontal slots 222 formed in the left-side endpiece 22 and respectively outwardly extending from the respective top ends of the first vertical slots 221 at right angles, and two second horizontal slots 232 formed in the right-side endpiece 23 and respectively outwardly extending from the respective bottom ends of the second vertical slots 231 at right angles. The design of the two second horizontal slots 232 provide a space for the protruding portions 61 of the right-side hook 6 so that the protruding portions 51 of the left-side hook 5 can be moved by the elongated operating frame bar 2 to force the retaining portion 50 through the elongated slot 124 of the front wall 121 of the display 12 into the locating hole 111 of the base member 11.

Figure 6:
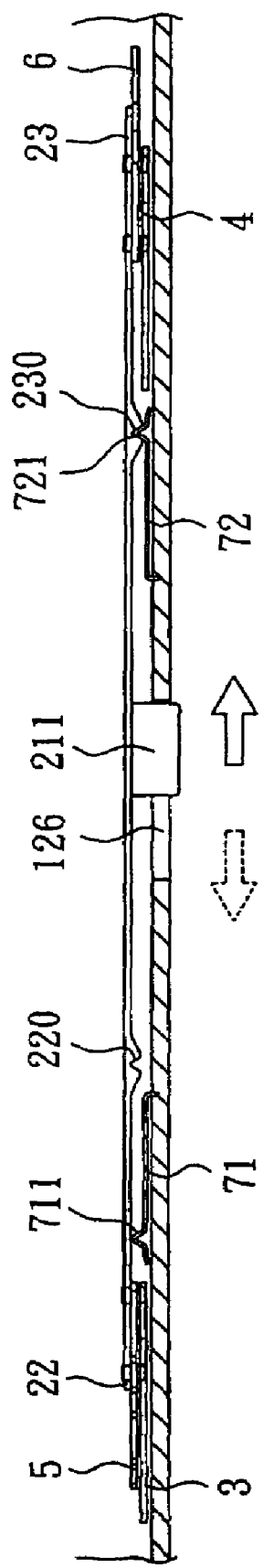
FIG. 6 is a top view of the preferred embodiment of the present invention.

Referring to FIG. 6 and FIG. 2~FIG. 4 again, when forcing the protruding portions 51 of the left-side hook 5 through the elongated slot 124 of the front wall 121 of the display 12 into the locating hole 111 of the base member 11, the right locating flange 721 of the right-side locating plate 72 will be engaged into the second locating groove 230 of the elongated operating frame bar 2 to stop the elongated operating frame bar 2 in place.

Figure 5:
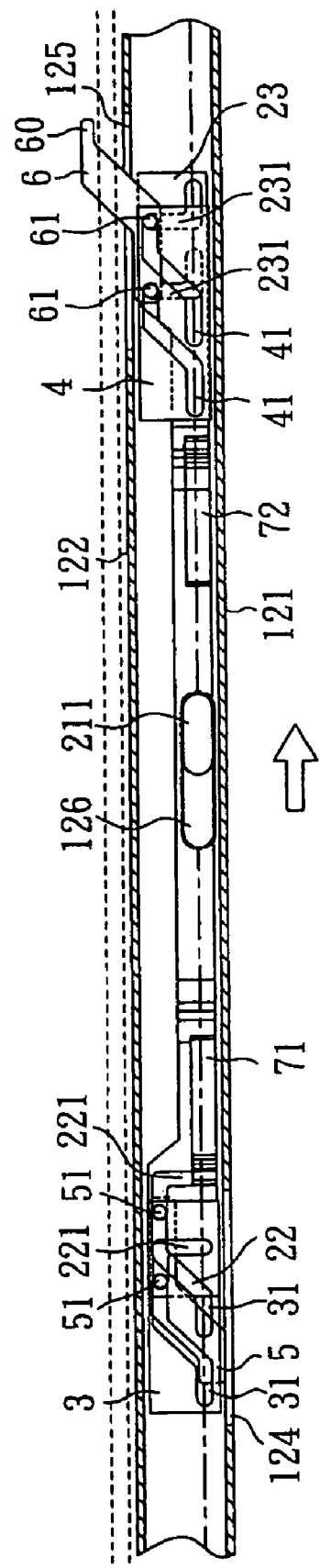
FIG. 5 is a sectional view of the preferred embodiment of the present invention (II).

Referring to FIG. 5 and FIG. 2~FIG. 4 again, on the contrary, when wishing to set the dual-usage portable computer 1 in the form of a tablet PC, i.e., to reverse the display 12 and then to close the reversed display 12 on the base member 11, grasp the operating portion 211 of the elongated operating frame bar 2 with the fingers to move the elongated operating frame bar 2 rightwards relative to the display 12. At this time, the right-side hook 6 is forced by the second vertical slots 231 of the elongated operating frame bar 2 and the oblique slots 41 of the right-side frame 4 to insert the retaining portion 60 through the elongated slot 125 of the back wall 122 of the display 12 into the locating hole 111 of the base member 11.

In the aforesaid operating procedure, the second vertical slots 231 of the elongated operating frame bar 2 and the oblique slots 41 of the right-side frame 4 work to move the right-side hook 6 smoothly. The design of the two first horizontal slots 222 provide a space for the protruding portions 51 of the left-side hook 5 so that the protruding portions 61 of the right-side hook 6 can be moved by the elongated operating frame bar 2 to force the retaining portion 60 through the elongated slot 125 of the back wall 122 of the display 12 into the locating hole 111 of the base member 11.

Referring to FIG. 2~FIG. 6 when forcing the protruding portions 61 of the right-side hook 6 through the elongated slot 125 of the back wall 122 of the display 12 into the locating hole 111 of the base member 11, the left locating flange 711 of the left-side locating plate 71 will be engaged into the first locating groove 220 of the elongated operating frame bar 2 to stop the elongated operating frame bar 2 in place.

By means of moving the elongated operating frame bar 2 leftwards or rightwards to force the left-side hook 5 or right-side hook 6 out of the display 12 into engagement with the base member 11, the dual-usage portable computer is locked in the form of a notebook computer or tablet PC. Therefore, the operation of the present invention is simple.

Although the present invention has been explained in relation to its preferred embodiment, it is to be understood that many other possible modifications and variations can be made without departing from the spirit and scope of the invention as hereinafter claimed.

What is claimed is:

1. A common lock used in a dual-usage portable computer comprised of a base member and a display pivotally connected to said base member and rotated relative to said base member, said display having a front wall, a back wall, and a peripheral wall connected between said front wall and said back wall, said front wall having an elongated slot, said back wall having an elongated slot, said peripheral wall having an elongated opening disposed between the elongated slot of said front wall and the elongated slot of said back wall, said base member having a locating hole at a top wall thereof, said common lock comprising:

an elongated operating frame bar longitudinally slidably mounted inside said display, said elongated operating frame bar comprising an operating portion projecting from a middle part thereof and extending through the elongated opening of said peripheral wall to the outside of said display, at least one first vertical slot cut through a left-side endpiece thereof, and at least one second vertical slot cut through a right-side endpiece thereof;

a left-side frame fixedly mounted inside said display and adjacent to the left-side endpiece of said elongated operating frame bar, said left-side frame having at least one oblique slot sloping leftwards corresponding to the at least one first vertical slot of said elongated operating frame bar;

a right-side frame fixedly mounted inside said display and adjacent to the right-side endpiece of said elongated operating frame bar, said right-side frame having at least one oblique slot sloping rightwards corresponding to the at least one second vertical slot of said elongated operating frame bar;

a left-side hook sandwiched in between the left-side endpiece of said elongated operating frame bar and said left-side frame, said left-side hook having at least one protruding portion symmetrically disposed at each of two opposite sides thereof and respectively inserted into the at least one first vertical slot of said elongated operating frame bar and the at least one oblique slot of said left-side frame and a retaining portion curved downwards from one end thereof for insertion through the elongated slot of said front wall of said display into the locating hole of said base member; and a right-side hook sandwiched in between the right-side endpiece of said elongated operating frame bar and said right-side frame, said right-side hook having at least one protruding portion symmetrically disposed at each of two opposite sides thereof and respectively inserted into the at least one second vertical slot of said elongated operating frame bar and the at least one oblique slot of said right-side frame and a retaining portion curved upwards from one end thereof for insertion through the elongated slot of said back wall of said display into the locating hole of said base member.

2. The common lock as claimed in claim 1, wherein the at least one first vertical slot of said elongated operating frame bar further comprising a first horizontal slot extending at left angles at a top side thereof, the at least one second vertical slot of said elongated operating frame bar further comprising a second horizontal slot extending at right angles at a bottom side thereof.

3. The common lock as claimed in claim 1, wherein the number of the at least one first vertical slot is two; the number of the at least one oblique slot of said left-side frame is two; the number of the at least one protruding portion at each of the two opposite sides of said left-side frame is two.

4. The common lock as claimed in claim 1, wherein the number of the at least one second vertical slot is two; the number of the at least one oblique slot of said right-side frame is two; the number of the at least one protruding portion at each of the two opposite sides of said right-side frame is two.

5. The common lock as claimed in claim 1, wherein said elongated operating frame bar further comprises a left-side locating groove spaced between said left-side endpiece and said middle part; wherein the common lock further comprises a left-side locating plate fixedly mounted inside said display, said left-side locating plate having a left locating flange adapted to engage into the left-side locating groove of said elongated operating frame bar.

6. The common lock as claimed in claim 1, wherein said elongated operating frame bar further comprises a right-side locating groove spaced between said right-side endpiece and said middle part; wherein the common lock further comprises a right-side locating plate fixedly mounted inside said display, said right-side locating plate having a right locating flange adapted to engage into the right-side locating groove of said elongated operating frame bar.

* * * * *